United States Patent [19]

Wolff et al.

[11] 4,359,895

[45] Nov. 23, 1982

[54] NEEDLE POSITION INDICATOR FOR A FUEL INJECTOR NOZZLE HOLDER

[76] Inventors: George D. Wolff; Michael S. Ziemacki, both of P.O. Box 9407, Winter Haven, Fla. 33880

[21] Appl. No.: 87,983

[22] Filed: Oct. 25, 1979

[51] Int. Cl.³ .......................................... G01M 15/00
[52] U.S. Cl. .................................. 73/119 A; 123/612; 123/617; 324/208; 340/870.31
[58] Field of Search ............................ 340/870.31, 686; 123/612, 617; 324/207, 208; 338/32 H; 73/119 A; 239/533.2

[56] References Cited

U.S. PATENT DOCUMENTS

| | | | |
|---|---|---|---|
| 3,344,663 | 10/1967 | Dreisin et al. | 73/119 A |
| 3,412,602 | 11/1968 | Rush et al. | 73/119 A |
| 3,828,247 | 8/1974 | Kirsch et al. | 73/119 A |
| 3,942,366 | 3/1976 | Hofmann | 73/119 A |
| 4,066,059 | 1/1978 | Mayer et al. | 123/612 |
| 4,096,841 | 6/1978 | Kindermann et al. | 123/617 |
| 4,107,604 | 8/1978 | Bernier | 324/208 |
| 4,109,518 | 8/1978 | Dooley et al. | 73/119 A |

Primary Examiner—James J. Groody
Attorney, Agent, or Firm—Duckworth, Allen, Dyer and Pettis

[57] ABSTRACT

A needle position indicator is positioned within the interior of a fuel injector nozzle holder which includes a needle having upper and lower ends, a needle seat which engages the lower end of the needle, a chamber having an upper end and a lower end through which the upper end of the needle extends, and a spring positioned within the chamber for exerting a force against the upper end of the chamber and against the upper end of the needle to bias the needle against the needle seat. The needle position indicator includes a magnet which is positioned within the cavity to generate a magnetic field within the cavity and a detector which is positioned within the cavity to detect changes in the strength of the magnetic field within the cavity caused by relative displacements of the upper portion of the needle within the cavity.

31 Claims, 3 Drawing Figures

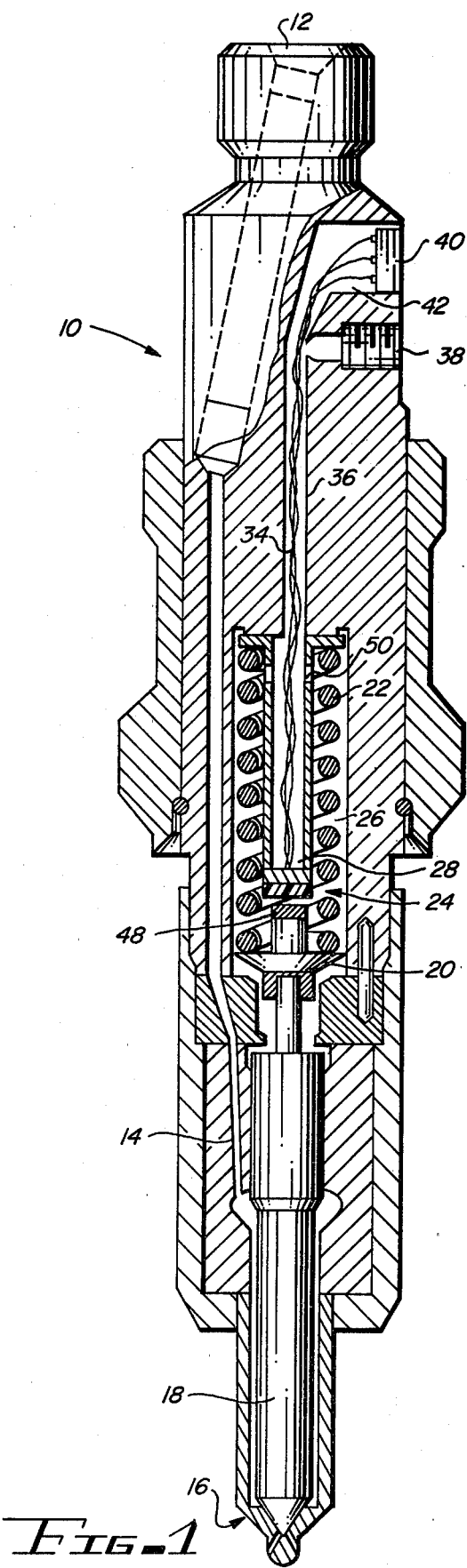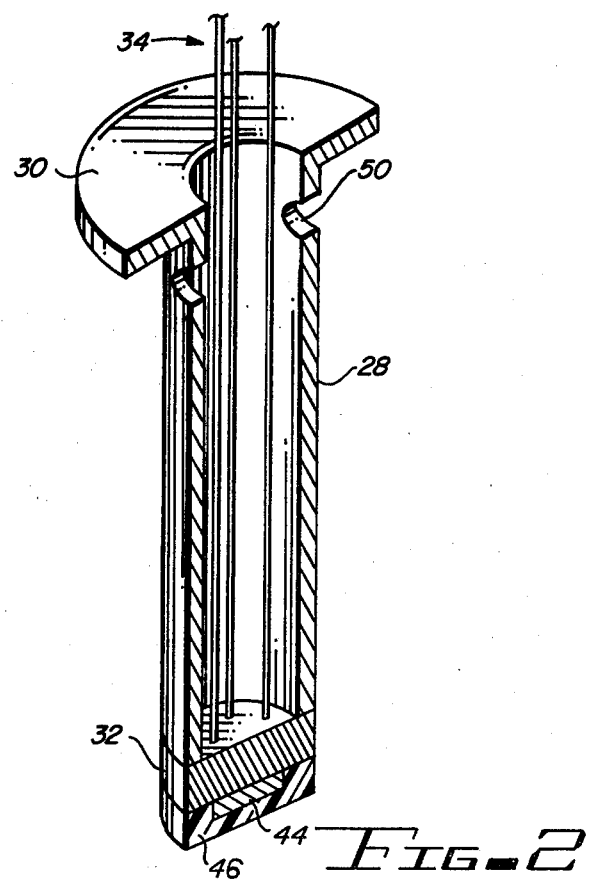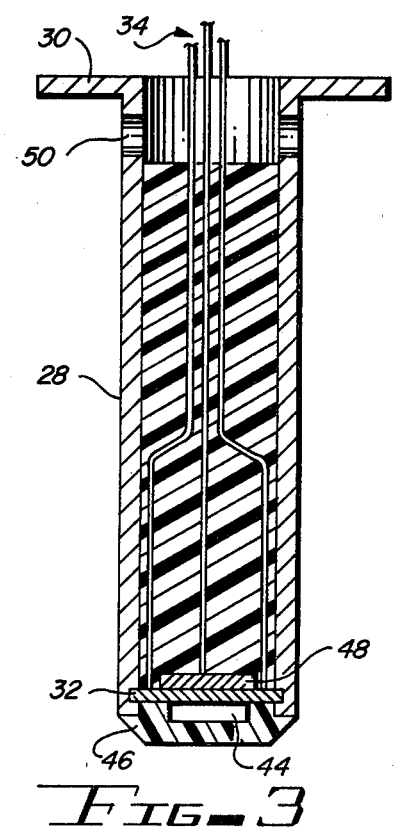

NEEDLE POSITION INDICATOR FOR A FUEL INJECTOR NOZZLE HOLDER

BACKGROUND OF THE INVENTION

1. Field of the Invention

The present invention relates to position indicators for fuel injector nozzle holders, and more particularly, to a needle position indicator which operates by detecting changes in the magnetic flux density within the interior of the nozzle holder.

2. Description of the Prior Art

A needle valve within a fuel injector nozzle holder is opened and closed at appropriately timed intervals to inject desired amounts of fuel into a cylinder of an internal combustion engine such as a diesel engine. It is essential to know when the needle valve opens in relation to the engine crank shaft position in order to designate the appropriate engine timing.

The needle valve comprises a needle and a needle seat. When the needle contacts the needle seat, the valve is closed. When the valve is lifted off the needle seat, the valve opens and fuel is metered through spray orifices into the interior of the engine cylinder. The initial relative vertical displacement between the needle and the needle seat determines the beginning of injection as well as the engine timing.

Engine timing must be set with precision to not only properly operate the engine, but also to control fuel consumption and the production of undesirable emissions. The engine timing must be set precisely for low fuel consumption while simultaneously minimizing undesired engine emissions. Since there is always a trade off between optimizing fuel consumption and minimizing emissions, engine timing must be set at a point which somewhat compromises both fuel consumption and emission reduction. As a result of the extremely stringent government fuel consumption and emission regulations, the engine timing must be optimized to levels substantially in excess of any prior art requirements. Conventionally, engine timing has been determined by reference to visual markings on the engine flywheel. A few experimental attempts have been made to electronically measure engine timing by determining needle position by inductive or capacitive devices positioned within a fuel injector nozzle holder.

SUMMARY OF THE INVENTION

The present invention contemplates a needle position indicator for a fuel injector nozzle holder. The nozzle holder includes a needle having upper and lower ends, a needle seat for engaging the lower end of the needle, a chamber having an upper end and a lower end through which the upper end of the needle extends, and a spring positioned within the chamber for exerting a force against the upper end of the chamber and against the upper end of the needle to bias the needle against the needle seat.

The needle position indicator includes means positioned within the chamber for generating a magnetic field within the cavity and means positioned within the cavity for detecting changes in the strength of the magnetic field within the chamber caused by relative displacements between the needle and the needle seat.

DESCRIPTION OF THE DRAWINGS

The invention is pointed out with particularity in the appended claims. However, other objects and advantages together with the operation of the invention may be better understood by reference to the following detailed description taken in conjunction with the following illustrations wherein:

FIG. 1 is a partially cut away sectional view of a fuel injector nozzle holder including a needle position indicator according to the present invention.

FIG. 2 is a partially cut away perspective view particularly illustrating the Hall Effect sensor and mounting bracket of the present invention.

FIG. 3 is a sectional view of a second embodiment of the Hall Effect sensor and its mounting bracket.

DETAILED DESCRIPTION OF THE INVENTION

In order to better illustrate the advantages of the invention and its contributions to the art, the various mechanical and electrical features of the preferred embodiment of the invention will now be described in detail.

Referring to FIGS. 1 and 2, a commonly used fuel injector nozzle holder 10 is illustrated. Nozzle holder 10 is of a conventional design and is commercially available from fuel injection equipment manufacturers such as Robert Bosch. A high pressure fuel line is coupled to input port 12 of nozzle holder 10. Pressurized fuel is transferred to input port 12 through passageway 14 into the lower section of nozzle holder 10 in which a needle valve is positioned. The needle valve includes a seat generally indicated by reference number 16 and a needle 18. A spring seat 20 is held by the spring against the upper section of needle 18 and forms an upper extention of needle 18. Spring seat 20 moves in synchronization with needle 18.

A cylindrical spring 22 includes a central spring cavity on passageway 24. Spring 22 is positioned within a cylindrical cavity 26 in nozzle holder 10. In the commercially manufactured version of fuel injector nozzle holder 10, the upper end of spring 22 contacts the upper end of cavity 26 while the lower end of spring 22 contacts spring seat 20. In this manner spring 22 exerts a biasing force against the upper end of needle 18 to bias the lower end of needle 18 against needle seat 16 to maintain the needle valve in the closed position. Fuel pressure at an appropriate level within passageway 14 exerts a force on needle 18 and displaces the entire needle assembly including needle 18 and spring seat 20 upward. Upward displacements of needle 18 are generally on the order of 0.4 to 0.7 millimeters.

In the preferred embodiment of the present invention, a cylindrical mounting bracket 28 includes a body which descends downward through the central spring cavity 24 of spring 22. In the embodiment illustrated the body of mounting bracket 28 is approximately 25 millimeters long and has a diameter of 4.3 millimeters. Mounting bracket 28 also includes a flange 30 on the upper surface. Flange 30 is positioned between the upper surface of cavity 26 and the upper end of spring 22. The upper biasing force exerted by spring 22 against the flange 30 which contacts the upper surface of cavity 26 serves to maintain mounting bracket 28 in a fixed position within the spring cavity 24 of spring 22.

A commercially available three lead header 32 is coupled to the lower portion of the body of mounting bracket 28. Header 32 is a commercially available TO-46 device which has been modified by removing the flange which surrounds the commercially available version. Two of the leads of header 32 pass through insulators in the header and penetrate the lower surface of the device. The third lead is a ground level which is coupled directly to the metallic body of the header. Header 32 utilized in the preferred embodiment of the present invention is manufactured by Airpax Electronics Company of Cambridge, Md. The three electrical leads 34 extending upward from header 32 are fabricated from number thirty Teflon coated wire. Electrical leads 34 are routed upward through the body of mounting bracket 28 and pass through passageway 36 which forms a fuel leakage path by connecting the interior of cavity 26 through the hole(s) 50 in mounting bracket 28 to fuel discharge port 38. To permit electrical leads 34 to extend further upward and to be coupled to receptacle 40, a passageway extension 43 is machined into the body of nozzle holder 10.

A Hall Effect sensor 44 is coupled to the lower surface of header 32. Sensor 44 is manufactured on a single 0.066 inch by 0.068 inch integrated circuit chip by Sprague Electric Company of Concord, N.H., and is designated by Model No. UGN-3501. This commercially available Hall Effect sensor includes a voltage regulator, a Hall Effect cell and an amplifier. A layer of epoxy encapsulation 46 surrounds the lower exposed surface of sensor 44. The interior body of mounting bracket 28 is typically filled with a potting compound, such as epoxy material, to mechanically secure electrical leads 34.

A Samarium cobalt permanent magnet 48 is adhesively secured to the top surface of spring seat 20. Magnet 48 is approximately two millimeters thick and is fabricated in a size which permits it to be positioned on the upper cylindrical surface of spring holder 20 without extending beyond the perimeter of this device. Magnet 48 is small, but produces a magnetic flux density of about 1200 Gauss. The upper surface of magnet 48 is separated from the lower surface of epoxy encapsulation 46 by a spacing of about one millimeter when the needle valve is in the resting or unactuated position. When needle 18 is displaced upward by about 0.4 to 0.7 millimeters as the needle valve is opened, the magnetic flux density in the vicinity of Hall Effect sensor 44 is substantially changed, causing the output voltage of this device to change linearly in proportion to the displacement of needle 18. This change in output voltage is transmitted by leads 34 to receptacle 40. A monitoring device may be coupled to receptacle 40 and indicates both the upward and the downward displacements of needle 18 which corresponds to either an increase or a decrease of the magnetic flux density within cavity 26.

Referring now to FIG. 3, a modified version of the preferred embodiment of the present invention is disclosed. In this embodiment, permanent manget 48 is coupled to the upper surface of header 32. Upward and downward displacements of spring holder 20 change the magnetic flux density in the vicinity of Hall Effect sensor 44 since spring holder 20 is fabricated from a ferromagnetic material. These changes in the flux density cause changes in the output state of sensor 44 in the same manner as that described above in connection with the embodiment illustrated in FIGS. 1 and 2.

FIG. 3 best illustrates that one or more vent holes 50 are positioned in the upper portion of mounting bracket 28. Vent holes 50 permit the free flow of discharge fuel from cavity 26 into fuel discharge passageway 36.

An oscilloscope may be coupled directly to receptacle 40 to monitor the output waveform generated by Hall Effect sensor 44. In this manner the timing of the needle valve opening and closing, the duration of injection, or continuous needle position can be monitored. In certain instances it may be desirable to couple a differentiator to receptacle 40 and couple an oscilloscope to the output of the differentiator. The differentiator produces a sharp readily discernable voltage spike when the needle valve either opens or closes.

The needle position indicator of the present invention may be included in each of the fuel injectors of an engine or may be included in only a single nozzle holder since engine timing can be set by reference to the opening time of only a single needle valve. Alternatively, the needle position indicator of the present invention may be included in a nozzle holder which is maintained at a maintenance station. Whenever it is necessary to set engine timing, a mechanic can remove the conventional nozzle holder from the engine and insert a nozzle holder including the needle position indicator of the present invention. The engine timing can thus be readily set and monitored by electronic monitoring devices used by the mechanic. Use of the needle position indicator permits engine timing to be set while the engine is running and in addition enables engine timing to be a continuous basis.

The needle position indicator of the present invention may also be coupled to provide a feedback signal for use in a closed loop electronically controlled timing system for a fuel injection system. In another embodiment, the needle position indicator of the present invention can be used to monitor wear of fuel injection system components by measuring engine timing changes, particularly at low speed. When the engine timing has changed a predetermined amount as indicated by relative timing of the opening of the needle valve, maintenance personnel can replace the appropriate fuel injection system element to prevent untimely mechanical failure.

It would be apparent to those skilled in the art that the disclosed needle position indicator for a fuel injector nozzle holder may be modified in numerous ways and may assume many embodiments other than the preferred forms specifically set out and described above. For example, the present invention can be incorporated in many different configurations of nozzle holders manufactured by many different organizations for use in passenger cars, tractors, trucks, ships, or any other type of diesel engine. Accordingly, it is intended by the appended claims to cover all such modifications of the invention which fall within the true spirit and scope of the invention.

We claim:

1. A needle position indicator for a fuel injector nozzle holder which includes
   a needle having upper and lower ends;
   a needle seat for engaging the lower end of the needle;
   a chamber having an upper end and a lower end through which the upper end of the needle extends;
   a spring having a central passageway, said spring positioned within the chamber for exerting a force against the upper end of the chamber and against the upper end of the needle to bias the needle against the needle seat said needle position indicator comprising:
   (a) means positioned within the cavity for generating a magnetic field within the cavity;
   (b) a mounting bracket having a body extending through the central passageway of said spring, said bracket having a lower end adjacent to and in alignment with the upper end of said needle; and (c) means mounted on the lower end of said bracket for detecting changes in the strength of the magnetic field caused by relative displacements between the needle and the needle seat.

2. The needle position indicator of claim 1 wherein said magnetic field generating means includes a permanent magnet.

3. The needle position indicator of claim 1 wherein said detecting means includes a Hall Effect sensor.

4. The needle position indicator of claim 3 wherein the upper end of said mounting bracket includes a flange which extends between the upper end of the spring and the upper end of the chamber and which is maintained in position by the biasing force exerted by the spring on said flange.

5. The needle position indicator of claim 4 wherein the central passageway of the spring is cylindrical in configuration.

6. The needle position indicator of claim 3 wherein the permanent magnet is coupled to the upper end of the needle and wherein said mounting bracket maintains said Hall Effect sensor in a fixed position above and in alignment with the upper end of the needle.

7. The needle position indicator of claim 3 further including means coupled to said Hall Effect sensor for transmitting the electrical output signal from said sensor to a point on the exterior surface of the nozzle holder.

8. The needle position indicator of claim 7 wherein said transmitting means includes a plurality of electrical conductors having one end coupled to said Hall Effect sensor, extending vertically upward through the body of said mounting bracket, through a passageway in the body of the nozzle holder, and terminating in a receptacle coupled to the exterior surface of the nozzle holder.

9. The needle position indicator of claim 4 wherein said permanent magnetic is coupled to said mounting bracket.

10. The needle position indicator of claim 8 wherein said permanent magnet is located in close proximity to said Hall Effect sensor.

11. The needle position indicator of claim 10 wherein said permanent magnet is coupled to the upper surface of said Hall Effect sensor.

12. The needle position indicator of claim 3 wherein the body of said mounting bracket is filled with a potting compound.

13. The needle position indicator of claim 12 wherein said potting compound is an epoxy material.

14. The needle position indicator of claim 6 wherein said mounting bracket maintains said Hall Effect sensor in a position approximately one millimeter above the upper end of the needle.

15. The needle position indicator of claim 1 wherein said magnetic field generating means includes a permanent magnet formed within the upper end of said needle.

16. The needle position indicator of claim 3 wherein said Hall Effect sensor is fabricated on a single integrated circuit chip.

17. A needle position indicator for a fuel injector nozzle holder which includes
a needle having upper and lower ends;
a needle seat for engaging the lower end of the needle;
a chamber having an upper end and a lower end through which the upper end of the needle extends;
a cylindrical spring including a central passageway and positioned within the chamber for exerting a force against the upper end of the needle to bias the needle against the needle seat;
said needle position indicator comprising:
(a) a permanent magnet positioned within the cavity for generating a magnetic field within the cavity;
(b) a mounting bracket coupled in a fixed position within the central passageway of the spring and adjacent the lower end of the spring; and
(c) a Hall Effect sensor coupled to the lower end of said mounting bracket for detecting changes in the strength of the magnetic field within the cavity caused by relative displacements between the needle and said Hall Effect sensor.

18. The needle position indicator of claim 17 wherein said permanent magnet is coupled to the upper end of the needle.

19. The needle position indicator of claim 17 wherein said permanent magnet is magnetically coupled with said Hall Effect sensor.

20. The needle position indicator of claim 17 wherein said permanent magnet forms a part of the upper end of the needle.

21. The needle position indicator of claim 17 wherein said permanent magnet forms a part of the nozzle holder.

22. The needle position indicator of claim 17 wherein the upper end of said mounting bracket includes a flange which extends between the upper end of the spring and the upper end of the chamber and which is maintained in position by the biasing force exerted by the spring on said flange.

23. The needle position indicator of claim 18 wherein said mounting bracket maintains said Hall Effect sensor in a fixed position above and in alignment with the upper end of the needle.

24. The needle position indicator of claim 17 further including means coupled to said Hall Effect sensor for transmitting the electrical output signal from said sensor to a point on the exterior surface of the nozzle holder.

25. The needle position indicator of claim 24 wherein said transmitting means includes a plurality of electrical conductors having one end coupled to said Hall Effect sensor, extending vertically upward through the body of said mounting bracket, through a passageway in the body of the nozzle holder, and terminating in a receptacle coupled to the exterior surface of the nozzle holder.

26. The needle position indicator of claim 17 wherein said permanent magnet is located in close proximity to said Hall Effect sensor.

27. The needle position indicator of claim 26 wherein said mounting bracket maintains said Hall Effect sensor in a position approximately one millimeter above the upper end of the needle.

28. The needle position indicator of claim 17 further including a lower spring seat coupled between said spring and said needle and wherein said lower spring seat forms said permanent magnet.

29. A needle position indicator for a fuel injector nozzle holder which includes
a needle having upper and lower ends;
a needle seat for engaging the lower end of the needle;

a chamber having an upper end and a lower end through which the upper end of the needle extends;

a generally cylindrical spring including a central passageway and positioned within the chamber for exerting a force against the upper end of the chamber and against the upper end of the needle to bias the needle against the needle seat;

said needle position indicator comprising:
(a) a permanent magnet positioned within the cavity and coupled to the upper end of the needle for generating a magnetic field within the cavity;
(b) a mounting bracket having an upper end toward the upper end of the cavity, and extending downwardly in the central cavity of the spring and including a lower end opposing the permanent magnet;
(c) a Hall Effect sensor coupled to the lower end of said mounting bracket at a point above and in alignment with the upper end of the needle and the permanent magnet;
(d) means coupled to said Hall Effect sensor for transmitting the electrical output signal from said sensor to a point on the exterior surface of the nozzle holder; and
(e) means coupled to said receptacle for converting the electrical output signal of said Hall Effect sensor into a signal representative of the needle position.

30. The needle position indicator of claim 29 wherein said mounting bracket maintains said Hall Effect sensor in a position approximately one millimeter above the upper end of the needle.

31. Apparatus for sensing the beginning of fuel injection in an internal combustion engine, said apparatus comprising:

a fuel injector nozzle holder having a chamber with a needle and a spring in said chamber, said spring biasing said needle into a seat for preventing fuel flow until said spring bias is overcome to permit fuel flow;

means including a magnet within said chamber for generating a magnetic field which changes with the movement of said needle from said seat; and means including a a bracket positioned within and extending through said spring in said chamber and a Hall Effect sensor carried by said bracket adjacent said magnet for detecting said changes in said magnetic field.

* * * * *